United States Patent Office 3,647,627
Patented Mar. 7, 1972

3,647,627
PROCESS FOR PRODUCING FLAVIN-ADENINE DINUCLEOTIDE

Masao Tanaka, Machida-shi, Nobuo Nakamura, Tokyo, and Seigo Takasawa, Machida-shi, Japan, assignors to Kyowa Hakko Kogyo Co., Ltd., Tokyo, Japan
No Drawing. Continuation of application Ser. No. 569,814, Aug. 3, 1966. This application July 12, 1968, Ser. No. 744,296
Claims priority, application Japan, Aug. 13, 1965, 40/48,942
The portion of the term of the patent subsequent to May 20, 1986, has been disclaimed
Int. Cl. C12d 13/06
U.S. Cl. 195—28 N   15 Claims

ABSTRACT OF THE DISCLOSURE

Flavin-adenine dinucleotide is produced by fermentation. A microorganism of Brevibacterium, Micrococcus, Corynebacterium or Flavobacterium is cultured in an aqueous medium under aerobic conditions at 20°–40° C. The product is recovered by ion-exchange resin treatment.

CROSS REFERENCE TO RELATED APPLICATION

This application is a continuation of copending application Ser. No. 569,814, filed on Aug. 3, 1966 now abandoned.

This invention relates to a process for producing flavin-adenine dinucleotide. More particularly, it relates to a process for the preduction of flavin-adenine dinucleotide by fermentation. Even more particularly, the invention relates to a process for the production of flavin-adenine dinucleotide by fermentation in the presence of certain 5′-purine nucleotide-producing strains.

Flavin-adenine dinucleotide (FAD) is a compound which plays a very important role as a coenzyme in the various enzymatic reactions of living cells. Recently, as vitamin $B_2$, or the biochemically active form of riboflavin, it has been used as a drug and as a filler for foodstuffs and feeds. FAD has a strong biochemical activity and a high solubility in water and, moreover, can be treated very easily. For these reasons, the use thereof in lieu of riboflavin has rapidly increased.

Hitherto known processes for the preparation of flavin-adenine dinucleotide involve extracting FAD from living cells or synthesizing FAD from riboflavin. The process of extracting FAD from cultured cellular bodies of Eremothecium ashbyii, which is a riboflavin-producing microorganism, has been considered the most economical process for preparing FAD on an industrial scale. However, a disadvantage of this process resides in the fact that the FAD is accumulated in the cells of this microorganism during the early stage of culturing with the consequent result that during the necessary lapse of time the FAD is decomposed into riboflavin through flavin mononucleotide. Thus, the recovery of FAD from the culture liquor is difficult with this latter process and involves numerous problems with respect to the extraction of the FAD from the cells as well as the isolation of extracted FAD from other flavin compounds.

One of the objects of the present invention is to provide an improved process for the production of flavin-adenine dinucleotide which overcomes the disadvantages and deficiencies of the prior art methods.

Another object of the present invention is to provide a process for producing flavin-adenine dinucleotide by fermentation which may be carried out in an efficacious and simple manner.

A further object of the invention is to provide a process for preparing flavin-adenine dinucleotide by fermentation which gives the product in high purity and good yield.

A still further object of this invention is to provide a process for producing flavin-adenine dinucleontide by fermentation which may be carried out advantageously and economically on an industrial scale to give a high yield of product.

These and other objects and advantages of the present invention will become apparent to those skilled in the art from a consideration of the following specification and claims.

As the result of much research by the present inventors, it has been found, in accordance with the present invention, that remarkable amounts of FAD can be accumulated in the culture liquor when 5′-purine nucelotide-producing strains of Brevibacterium, Micrococcus, Corynebacterium or Flavobacterium are cultured under the same conditions which are used for producing 5′-purine nucleotides. The FAD is produced and accumulated along with the 5′-purine nucleotide. The other flavin compounds normally found as by-products in processes employed for the production of FAD are not found in the FAD produced by the process of the present invention.

The process of the present invention is unknown to the prior art and has the advantage in that FAD can be produced as a by-product of a 5′-purine nucleotide and then can be separated easily therefrom. As noted above, the process of the present invention for simultaneously producing and accumulating 5′-purine nucleotides and FAD in the culture liquor is carried out with the strains of the genera of Brevibacterium, Micrococcus, Corynebacterium or Flavobacterium which are capable of producing 5′-purine nucleotides.

The optimum culturing conditions to be employed in the present invention are those conventionally used for producing 5′-purine nucleotides by fermentation. As for the composition of the culture medium, either a synthetic or a natural culture medium is suitable as long as it contains the essential nutrients for the growth of the microorganism employed. Such nutrients are well known in the art and include substances such as a carbon source, a nitrogen source, inorganic compounds and the like which are utilized by the strain employed in appropriate amounts. Thus, as a carbon source, there may be mentioned, by way of example, glucose, fructose, mannose, galactose, sucrose, maltose, lactose, starch hydrolysate, molasses, or other carbohydrates and the like. The carbon source may be either one substance or a mixture of two or more. As a nitrogen source, various kinds of inorganic or organic salts or compounds such as ammonia, ammonium sulfate, ammonium chloride, ammonium nitrate, ammonium carbonate, ammonium acetate, etc., nitrates, urea, or other compounds containing nitrogen, such as peptone, casein hydrolysates, meat extract, yeast extract, cornsteep liquor, distiller's solubles, fish meal, rice bran extract and the like may be employed. The nitrogen source may also be one of these substances or a combination of two or more. Furthermore, inorganic compounds which are added to the culture medium include potassium dihydrogen phosphate, potassium monohydrogen phosphate, magnesium sulfate, calcium carbonate, manganese sulfate, potassium chloride as well as other metal salts such as those of zinc, iron, etc. Various mutants, which are obtained by a variety of mutation induction methods, of the genera mentioned above may be employed. If a mutant having a specific nutrient requirement is employed, this nutrient must also be added to the culture medium. Essential nutrients of this type include, for example, amino acids such as aspartic acid, glutamic acid, threonine, methionine, etc. and/or vitamins such as biotin, thiamine, cobalamin, etc.

Culturing or fermentation is carried out under aerobic conditions such as aerobic shaking of the culture or with aeration and agitation of a submerged culture. The temperature is preferably maintained at between about 20° and 40° C., while the pH is kept between about 5.5 and 9.0. Culturing is generally carried out from 2 to 10 days.

Some of the strains of the aforesaid genera directly produce and accumulate 5′-nucleotides. Consequently, in using such cultures, the specific substance, except the nutrient substances which are indispensable for the growth of the particular microorganism, is not added in particular to the culture medium, thereby permitting the 5′-purine nucleotide and FAD to be produced and accumulated simultaneously. With certain other strains, the corresponding nucleotides are produced in the presence of a purine salt or nucleoside in the culture medium and, with such strains, these salts or nucleosides or natural substances containing the same are added to the culture medium in order to obtain the object of the present invention.

Culturing the aforesaid microorganisms under the above-noted conditions yields a production of FAD in the range of from about 50 to 150 µg./ml. in the culture liquor. The amount of FAD produced therein is proportional to the amount of 5′-nucleotide produced. The more 5′-nucleotide that is produced and accumulated the more FAD that is produced and accumulated.

As an example, the relationship of 5′-inosinic acid and FAD produced by fermentation with *Brevibacterium ammoniagenes* with respect to the lapse of time is shown in Table 1. Almost similar results are obtained when other strains are used or when other 5′-nucleotides are produced and accumulated.

TABLE 1

| | *Brevibacterium ammoniagenes* | | | |
|---|---|---|---|---|
| | ATCC 6872 | | No. 20101 ATCC 19183 | |
| | 5′-inosinic acid (mg./ml.) | FAD (µg./ml.) | 5′-inosinic acid (mg./ml.) | FAD (µg./ml.) |
| Culturing time (hours): | | | | |
| 24 | 1.2 | 14.8 | 0.9 | 14.1 |
| 36 | 2.5 | 44.9 | 2.5 | 40.0 |
| 48 | 5.3 | 83.1 | 3.9 | 53.5 |
| 60 | 8.2 | 96.6 | 6.8 | 85.7 |
| 72 | 8.6 | 104.4 | 8.8 | 114.6 |
| 84 | 10.6 | 117.0 | 8.9 | 116.8 |
| 96 | 12.7 | 118.0 | | |

After culturing is terminated, the 5′-purine nucleotide and FAD can be easily separated by the use of conventional methods, such as ion exchange resin treatment, chromatography, solvent extraction, the use of active carbon and the like. The FAD thus recovered can then be further purified in a conventional manner and can then be crystallized to give a product of high purity.

The following examples are given merely as illustrative of the present invention and are not to be considered as limiting. Unless otherwise noted, the percentages therein are by weight per liter of water.

EXAMPLE 1

*Brevibacterium ammoniagenes* ATCC 6872 is employed as the seed strain and is cultured for 24 hours in a culture medium containing 2% of glucose, 1% of peptone, 1% of yeast extract and 0.25% of NaCl. Then, 10% by volume of the cultured seed medium is inoculated into a fermentation medium, which contains the following ingredients in 1 liter of water:

100 g. glucose
6 g. urea
10 g. $K_2HPO_4$
10 g. $KH_2PO_4$
10 g. $MgSO_4 \cdot 7H_2O$
0.1 g. $CaCl_2 \cdot 2H_2O$
10 mg. calcium pantothenate
2 mg. thiamine hydrochloride
30 µg. biotin 19 ml. portions of the aqueous solution containing the culture medium components, except urea, are separately poured into individual 250 ml. conical flasks. The flasks are sterilized in an autoclave under a pressure of approximately 1 kg./cm.[2] for 15 minutes. Thereafter, 1 ml. of urea, a 12% solution which is separately sterilized, is added to each flask prior to said inoculation.

Culturing is carried out with aerobic shaking at 30° C.

Culturing is carried out for 48 hours, and then hypoxanthine is added to the culture medium in the amount of 5 mg./ml. After 48 more hours of culturing, 12.7 mg./ml. of 5′-inosinic acid and 118.0 µg./ml. of FAD are produced and accumulated in the fermentation liquor.

One liter of the resultant culture liquor is filtered, and the microorganisms are removed therefrom. The filtrate is adjusted to a pH of 8.0. It is then conveyed into a resin column filled with 200 ml. of Diaion SA 21A, a strongly basic ion exchange resin which is treated with a sufficient amount of hydrochloric acid and washed with water until neutrality is reached. After washing the resin column with water, separation is effected with one liter of an aqueous solution of 0.02 N hydrochloric acid and 1 M sodium chloride. As a consequence, the 5′-inosinic acid and flavin mononucleotide are entirely removed from the ion exchange column. The resin is then treated with an aqueous solution of 0.02 N hydrochloric acid and 1 M sodium chloride, and about 500 ml. of elute solution containing FAD alone is obtained. This elute solution contains 82.0 mg. of FAD.

The elute solution containing the FAD is saturated with ammonium sulfate and is extracted with phenol. The phenol solution is added with a sufficient amount of ethyl ether and is re-extracted with water. The resultant aqueous solution is concentrated at 50° C. or lower into about a 10 ml. volume. A sufficient amount of ethanol is added to this concentrated solution and the solution is left to stand. The precipitated FAD is then separated centrifugally. The obtained FAD is dried and the activity thereof is measured with an apo-D-amino acid oxidase. Obtained is 61.7 mg. of FAD having a purity of 82%. This FAD contains only negligible impurities of the flavin derivatives. A higher purity of FAD can easily be obtained by repeating the ion exchange chromatography process described above.

EXAMPLE 2

*Micrococcus glutamicus* ATCC 19185 is employed as the seed strain. This microorganism is cultured for 24 hours at 30° C. in a seed medium containing 2% of glucose, 1% of peptone, 1% of meat extract, 0.3% of NaCl and 20 µg. of biotin. 10% by volume of this cultured seed medium is inoculated into the following fermentation medium, the amounts shown being per liter of water:

70 g. glucose
6 g. urea
1 g. $KH_2PO_4$
3.0 g. $K_2HPO_4$
0.03 g. $MgSO_4 \cdot 7H_2O$
0.01 g. $FeSO_4 \cdot 7H_2O$
5.0 g. casamino acid
30 µg. biotin
5 mg. thiamine hydrochloride
10 mg. calcium pantothenate
20 mg. adenine
20 mg. guanine The amount of 6.0 g. of urea per liter of culture medium is added as a 40% aqueous solution which is separately prepared and sterilized. The pH of the culture medium is adjusted to 7.5 prior to sterilization thereof.

The fermentation media is poured in 30 ml. portions into separate 250 ml. conical flasks.

Culturing is carried out with aearobic shaking at 30° C. After culturing is carried out continuously for 96 hours, 10.7 mg./ml. of 5'-inosinic acid and 113.7 μg./ml. of FAD are found to be accumulated in the fermentation liquor and may be separated therefrom as described in Example 1.

EXAMPLE 3

*Brevibacterium ammoniagenes* ATCC 19183 is used as the seed strain. Culturing is conducted for 110 hours under the same conditions and in the same medium as described in Example 2. Produced and accumulated in the culture liquor as a result thereof are 11.2 mg./ml. of 5'-inosinic acid and 121.2 μg./ml. of FAD.

EXAMPLE 4

*Brevibacterium ammoniagenes* ATCC 6872 is employed as the seed strain, and culturing is carried out as described in Example 1 except that 1 mg./ml. of adenine is added to the cutlure medium instead of hypoxanthine. Culturing is carried out continuously for 96 hours. As a result, 8.3 mg./ml. of 5'-adenylic acid as well as 101.2 μg./ml. of FAD are produced and accumulated in the fermentation liquor.

EXAMPLE 5

The same seed strain as described in Example 4 is cultured under the same conditions and in the same media as described in Example 1 except that guanine in the amount of 1 mg./ml. instead of hypoxanthine is added to the culture medium. After 96 hours of continuous culturing, 5.2 mg./ml. of 5'-guanylic acid and 82.3 μg./ml. of FAD are accumulated in the fermentation liquor.

EXAMPLE 6

As the seed strain, *Brevibacterium linens* ATCC 9175 is used, and culturing is carried out as described in Example 1 except that adenine in the amount of 2 mg./ml. instead of hypoxanthine is added to the fermentation medium. 8.2 mg./ml. of 5'-adenylic acid and 59.7 μg./ml. of FAD are accumulated in the fermentation liquor.

EXAMPLE 7

*Micrococcus freudenreichii* ATCC 8459 is used as the seed strain, and the culturing is carried out under the same conditions and in the same media as described in Example 1. Hypoxanthine in the amount of 2 mg./ml. is added to the culture medium. After 96 hours of culturing, 9.7 mg./ml. of 5'-inosinic acid and 98.3 μg. ml. of FAD are accumulated in the fermentation liquor.

EXAMPLE 8

*Corynebacterium acetoglutamicum* ATCC 15806 is employed as the seed strain, and culturing is carried out as described in Example 1. Xanthine in the amount of 2 mg./ml. is added to the fermentation liquor. At the completion of culturing, 7.2 mg./ml. of 5'-xanthylic acid and 62.4 μg./ml. of FAD are found to be simultaneously accumulated in the resultant culture liquor.

EXAMPLE 9

*Corynebacterium hydrocarboclastus* ATCC 15592 is employed as the seed strain, and culturing is carried out as described in Example 1. Hypoxanthine is added to the culture liquor in the amount of 1 mg./ml. At the completion of culturing, 8.9 mg./ml. of 5'-inosinic acid and 53.5 μg./ml. of FAD are found to be accumulated in the fermentation liquor.

EXAMPLE 10

*Flavobacterium arborescens* ATCC 4358 is employed as the seed strain, and culturing is carried out under the same conditions and the same media as described in Example 1. As a result, 7.2 mg./ml. of 5'-inosinic acid and 61.3 μg./ml. of FAD are accumulated in the fermentation liquor.

EXAMPLE 11

*Flavobacterium devorans* ATCC 10829 is used as the seed strain. Culturing is carried out in the same manner as described in Example 1. As a result, 8.9 mg./ml. of 5'-inosinic acid and 98.3 μg./ml. of FAD are simultaneously accumulated in the fermentation liquor.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A process for producing flavin-adenine dinucleotide which comprises culturing a microorganism capable of producing a 5'-purine nucleotide and belonging to a genus selected from the group consisting of Brevibacterium, Micrococcus, Corynebacterium and Flavobacterium in an aqueous nutrient medium under aerobic conditions and recovering the flavin-adenine dinucleotide produced in the resultant culture liquor.

2. The process of claim 1, wherein culturing is carried out at a temperature of from about 20° to 40° C. and at a pH of from about 5.5 to 9.0.

3. The process of claim 1, wherein the flavin-adenine dinucleotide is recovered by an ion exchange resin treatment.

4. The process of claim 1, wherein said microorganism is selected from the group consisting of *Brevibacterium ammoniagenes, Micrococcus glutamicus, Brevibacterium linens, Micrococcus freudenreichii, Corynebacterium acetoglutamicum, Corynebacterium hydrocarboclastus, Flavobacterium arborescens and Flavobacterium devorans.*

5. The process of claim 4, wherein culturing is carried out at a temperature of from about 20° to 40° C. and at a pH of from about 5.5 to 9.0.

6. The process of claim 5, wherein the flavin-adenine dinucleotide is recovered by an ion exchange resin treatment.

7. The process of claim 5, wherein said microorganism is *Brevibacterium ammoniagenes* ATCC 6872.

8. The process of claim 5, wherein said microorganism is *Micrococcus glutamicus* ATCC 19185.

9. The process of claim 5, wherein said microorganism is *Brevibacterium ammoniagenes* ATCC 19183.

10. The process of claim 5, wherein said microorganism is *Brevibacterium linens* ATCC 9175.

11. The process of claim 5, wherein said microorganism is *Micrococcus freudenreichii* ATCC 8459.

12. The process of claim 5, wherein said microorganism is *Corynebacterium acetoglutamicum* ATCC 15806.

13. The process of claim 5, wherein said microorganism is *Corynebacterium hydrocarboclastus* ATCC 15592.

14. The process of claim 5, wherein said microorganism is *Flavobacterium arborescens* ATCC 4358.

15. The process of claim 5, wherein said microorganism is *Flavobacterium devorans* ATCC 10829.

References Cited

UNITED STATES PATENTS 2,973,305   2/1961   Masuda et al. _____ 195—28 N
3,445,336   5/1969   Tanaka et al. _____ 195—28 N ALVIN E. TANENHOLTZ, Primary Examiner